F. O. W. NEW.
LOCKING DEVICE.
APPLICATION FILED FEB. 13, 1920.
1,360,563.
Patented Nov. 30, 1920.
2 SHEETS—SHEET 1.
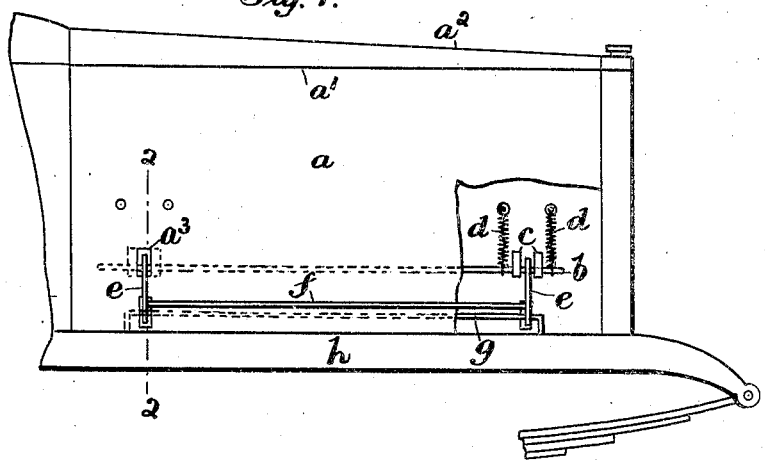
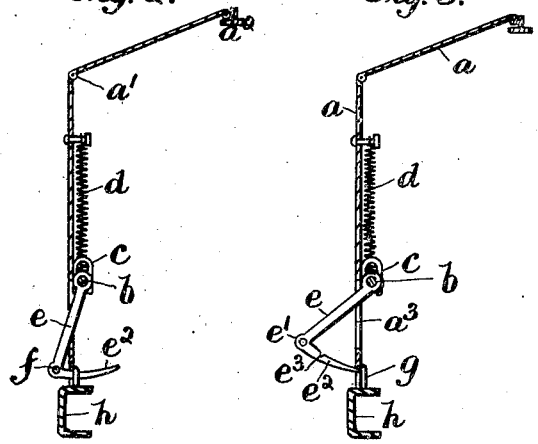
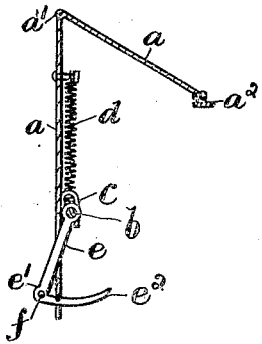
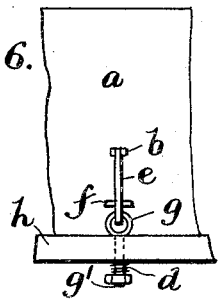
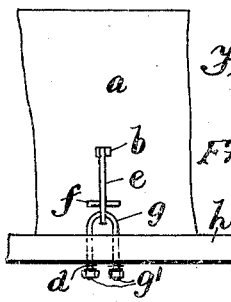
Inventor.
Frank O. W. New.
By T. Walter Fowler
Atty.

F. O. W. NEW.
LOCKING DEVICE.
APPLICATION FILED FEB. 13, 1920.
1,360,563.
Patented Nov. 30, 1920.
2 SHEETS—SHEET 2.
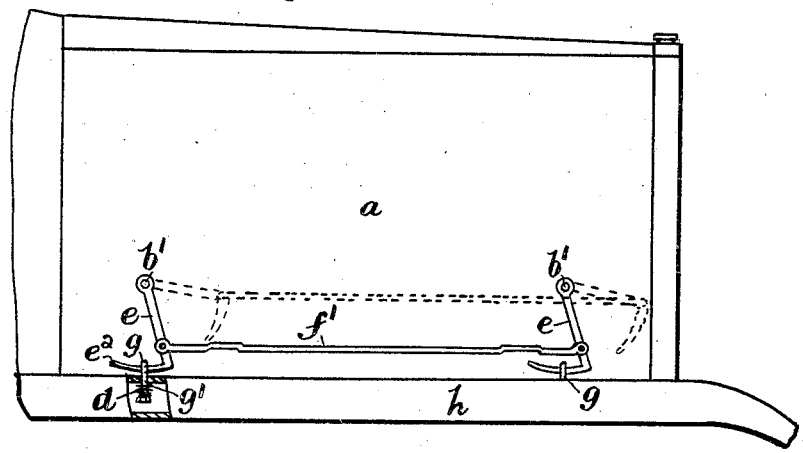
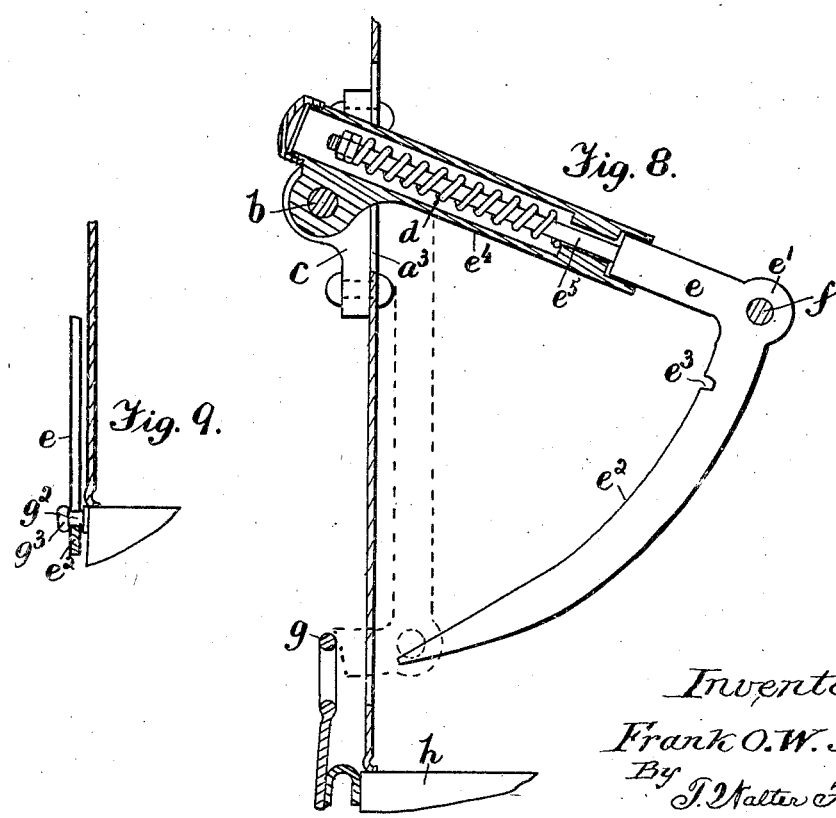
Inventor,
Frank O. W. New.
By T. Walter Fowler
Atty.

UNITED STATES PATENT OFFICE.

FRANK OSSIAN WALTER NEW, OF MELTON MOWBRAY, LEICESTER, ENGLAND.

LOCKING DEVICE.

1,360,563.  Specification of Letters Patent.  Patented Nov. 30, 1920.

Application filed February 13, 1920. Serial No. 358,330.

*To all whom it may concern:*

Be it known that I, FRANK OSSIAN WALTER NEW, solicitor, a subject of the King of England, and residing at Melton Mowbray, in the county of Leicester, England, have invented certain new and useful Improvements in Locking Devices, of which the following is a specification.

This invention relates to catches or locking devices especially intended for the engine hoods of automobiles and the like, and consists of an improved device for holding down the side of the hood or the like by spring action so as to minimize rattle when in the locked position.

According to the present invention, there are provided at suitable positions along the side of the hood or the like two or more catches in the form of L-shaped levers or hooks, connected together by means of an operating bar, whereby the hooks may be engaged or released simultaneously by force applied to the operating bar. This operating bar may be arranged longitudinally of the hood and parallel to the spindles on which the hooks are mounted, so as to swing outward when releasing the catches, or alternatively the pivots of the hooks and their attachments to the operating bar may be alined transversely of the length of the vehicle, so that each set moves in a substantially vertical plane and in the manner of a parallel rule.

In operating this device the bar is gripped by hand and one continuous movement serves to release the hooks and raise the side of the hood; similarly one movement serves to close the hood and press home the hooks.

The invention is hereafter more fully described with reference to the accompanying drawings, in which:—

Figure 1 is a side elevation of the front portion of an automobile showing one form of construction.

Fig. 2 is a section on line 2—2, showing the catch engaged.

Fig. 3 is a similar view showing the catch entering one engagement.

Fig. 4 is a similar view showing the catch released and the side of the hood partly raised.

Fig. 5 is a partial side elevation, representing an alternative construction.

Fig. 6 is a similar view showing another form of spring clip.

Fig. 7 is a view similar to Fig. 1, representing a third construction.

Fig. 8 is a detail illustrating a modified form of hook and clip.

Fig. 9 shows an alternative form of clip for use with the telescopic hook.

In the arrangement represented in Figs. 1 to 4, the engine hood $a$ is formed in the usual manner of panels hinged together at $a'$ and mounted upon a longitudinal support $a^2$ at the top; a spindle $b$ is attached to the side panel of the hood and is carried by slotted brackets or the like $c$ so as to be displaceable in a vertical direction, being drawn upward by helical or leaf springs $d$ of which four are represented by way of example.

The spindle $b$ carries hooks $e$ rigidly secured thereto and passing through slots $a^3$ in the hood; these hooks are connected together at their projecting corners $e'$ by an operating bar $f$ which lies close against the side of the hood, as represented in Fig. 2. The free ends $e^2$ of the L-shaped hooks are curved substantially concentric to the spindles $b$ and engage with suitable clips $g$ attached to the supporting member or chassis $h$.

The curved free end of each hook is so shaped that as it engages the clip $g$ (see Fig. 3) the toe or entering portion first draws down the spindle $b$ thereby causing the spring to pull or force the hood down firmly upon its seating; after the springs have been loaded to a predetermined extent, the free arm of the hook next presents upon its upper surface a notch or concavity $e^3$ into which the clip $g$ snaps, so locking the hook against accidental movement. In order to release the hood, the operating rod $f$ is swung outwardly from the position of Fig. 2, first to that of Fig. 3, and then after the hooks are disengaged is raised together with the panel to the position shown in Fig. 4.

Separate eyes or clips $g$ may be provided for the several hooks, and these clips may be mounted in a fixed or adjustable manner upon the chassis by means of a plate or otherwise; these eyes or clips may be provided with rollers to engage the hooks.

In a modification of this arrangement the hooks may be provided with telescopic shanks in which the helical springs are inclosed; these springs serve to hold down the hood or cover in the same way as previously described after the hook has been engaged with the corresponding eye or clip.

Figs. 5 and 6 illustrate constructions in which the hooks $e$ are secured to a spindle $b$ which is carried in rigid bearings mounted upon the inner or outer surface of the hood, the eyes or clips $g$ being arranged upon spring plungers $g'$ movable vertically but prevented from turning in guides $h'$ which are secured to the frame members $h$ or engine bearers inside the hood and in line with the hooks. In Fig. 5, the plungers $g'$ have two parallel legs sliding in the guides, and in Fig. 6 a single leg is provided, the plunger being prevented from turning by a feather, square or like device on the leg engaging in a correspondingly shaped guide. The upper ends of the spring plungers $g$ may be slotted or otherwise formed to engage the curved extremities of the hooks $e$, and, as in the previous case, they may be provided with rollers for this purpose. Means may also be provided for altering the tension of the springs $d$ upon the plungers.

Fig. 7 represents a modified arrangement in which the hooks $e$ are mounted upon pivots $b'$ alined transversely of the vehicle and connected by an operating bar $f'$, so that the hooks and bar swing in a longitudinal direction. Each set, therefore, moves in a substantially vertical plane and in the manner of a parallel rule. The eyes are mounted upon spring plungers as in the last construction, but if desired the hooks may be made telescopic and engaged with rigid clips.

Fig. 8 illustrates a suitable form of telescopic hook, in which the shank comprises a tubular portion $e^4$ attached to the spindle $b$ and inclosing a rigid portion $e^5$ connected to the curved extremity $e^2$. The helical spring $d$ is fitted upon the rigid stem $e^5$ and bears upon a shoulder at the bottom of the tubular member, being adjustable by means of lock-nuts, screwed upon the stem. The curved extremity of each hook engages a clip or eye $g$ attached to the frame $h$; alternatively as shown in Fig. 9, in which the telescopic hooks are mounted as in Fig. 7, this clip may comprise a reduced portion or neck $g^2$ to engage the curved cam-surface of the hook, with an outer head $g^3$ to prevent the latter from becoming detached laterally. This construction is especially suitable in the case of motor vehicles in which the hood comes flush with the vertical sides of the frame member. The supporting brackets for the hooks may be placed upon the outer surface of the hood instead of the inner as shown.

Although described in connection with an engine hood, the locking device may be adapted to many other uses, for example, it may be employed as a catch for a box-lid.

Having thus described my invention, what I claim as such and desire to secure by Letters Patent is:—

1. A locking device, comprising a plurality of hooks, said hooks having their free ends curved concentrically to their pivots, means engageable by the free ends of said hooks, means for securing hooks against accidental release, and an operating bar, said bar connecting the curved free ends of said hooks whereby they may be engaged or released simultaneously by a swinging movement of said bar about the pivots of said hooks.

2. A locking device for engine hoods, comprising a plurality of hooks, a common axis upon which said hooks are mounted, said axis being resiliently supported upon a movable portion of the hood, means secured upon a stationary member and engageable by said hooks, means for preventing accidental disengagement of said hooks, and an operating bar connecting the free ends of said hooks whereby said hooks may be engaged or released simultaneously by a swinging movement of said bar about the common axis of said hooks.

3. A locking device, comprising a plurality of hooks, means engageable by said hooks, said hooks and means respectively mounted upon the members to be locked together, resilient means for maintaining tension upon said hooks when engaged, and an operating bar connecting the free ends of said hooks whereby said hooks may be engaged or released simultaneously, said bar forming also a handgrip whereby the members may be separated by a continuation of the releasing movement.

4. A locking device, comprising a plurality of hooks, a spindle upon which said hooks are mounted, said spindle being supported upon one of the members to be locked, means engageable by said hooks located upon the other member to be locked, springs connected to said spindle for maintaining tension upon said hooks when engaged, and an operating bar connecting the free ends of said hooks whereby said hooks may be engaged or released simultaneously, said bar forming also a handgrip whereby the members may be separated by a continuation of the releasing movement.

5. A locking device, comprising a plurality of hooks, a spindle upon which said hooks are mounted in parallel relation, guides for said spindle, said guides allowing movement of said spindle in the direction of the length of said hooks, springs connected to said spindle for maintaining tension upon said hooks when engaged, said guides and springs mounted upon one of the members to be locked, means engageable by said hooks located upon the other of the members to be locked, and an operating bar connecting the free ends of said hooks whereby said hooks may be engaged or released simultaneously, said bar forming also a handgrip whereby the members may be separated by a continuation of the releasing movement.

6. A locking device for automobile hoods, comprising a plurality of hooks, a spindle upon which said hooks are mounted, said spindle being supported upon a movable portion of the hood and longitudinally of the vehicle, means engageable by said hooks located upon a stationary portion of the vehicle, springs maintaining tension upon said hooks when engaged, and an operating bar connecting the free ends of said hooks and extending longitudinally of the vehicle whereby said hooks may be engaged or released simultaneously by a swinging movement of said bar about said spindle, said bar forming also a handgrip whereby the hood may be raised after the release or lowered before the engagement of said hooks, in continuation of such swinging movement.

In testimony whereof I have affixed my signature in presence of two witnesses.

FRANK OSSIAN WALTER NEW.

Witnesses:
VICTOR F. FEENY,
CYRIL J. FEENY.